United States Patent [19]

Coon

[11] 4,009,825
[45] Mar. 1, 1977

[54] CONTROL FOR FORCED AIR HEATING OR COOLING SYSTEM

[76] Inventor: George M. Coon, Hillside House Saybrook Road, Essex, Conn. 06426

[22] Filed: Feb. 11, 1976

[21] Appl. No.: 657,110

[52] U.S. Cl. .................. 236/1 E; 165/22; 318/305; 318/348; 318/349; 323/39; 323/80
[51] Int. Cl.² .............................. F24F 3/02
[58] Field of Search ............ 165/22; 318/305, 348, 318/349; 323/36, 39, 80, 69; 307/117; 219/364, 486, 487; 236/DIG. 9, 1 B, 1 E

[56] References Cited

UNITED STATES PATENTS

| | | | |
|---|---|---|---|
| 1,282,017 | 10/1918 | Stack | 318/305 |
| 3,273,143 | 9/1966 | Wasserman | 323/80 |
| 3,693,047 | 8/1972 | Hamstra | 307/117 |
| 3,814,173 | 6/1974 | Coon | 165/122 |
| 3,815,001 | 6/1974 | Jamieson | 318/305 |
| 3,962,615 | 6/1976 | Spangler | 318/305 |

*Primary Examiner*—William E. Wayner
*Assistant Examiner*—Robert J. Charvat
*Attorney, Agent, or Firm*—Oltman and Flynn

[57] ABSTRACT

An SCR motor speed controller in a forced air heating and/or cooling system has a relay-operated potentiometer with a variable voltage tap which controls the speed of the fan motor in accordance with the total demand from individual room thermostats. Each room thermostat controls the operation of a corresponding control relay to short-circuit a corresponding part of the potentiometer on one side of its variable-voltage tap and to add in a corresponding part of the potentiometer on the opposite side of its variable voltage tap in response to a demand from the thermostat.

14 Claims, 3 Drawing Figures

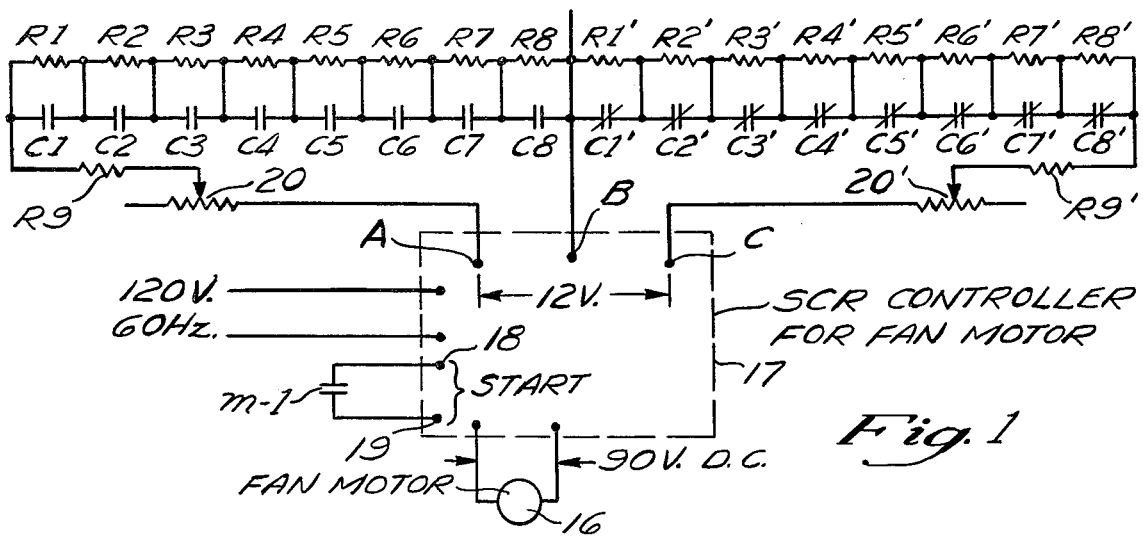
*Fig. 1*
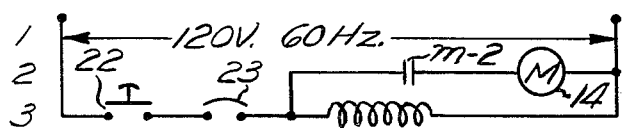
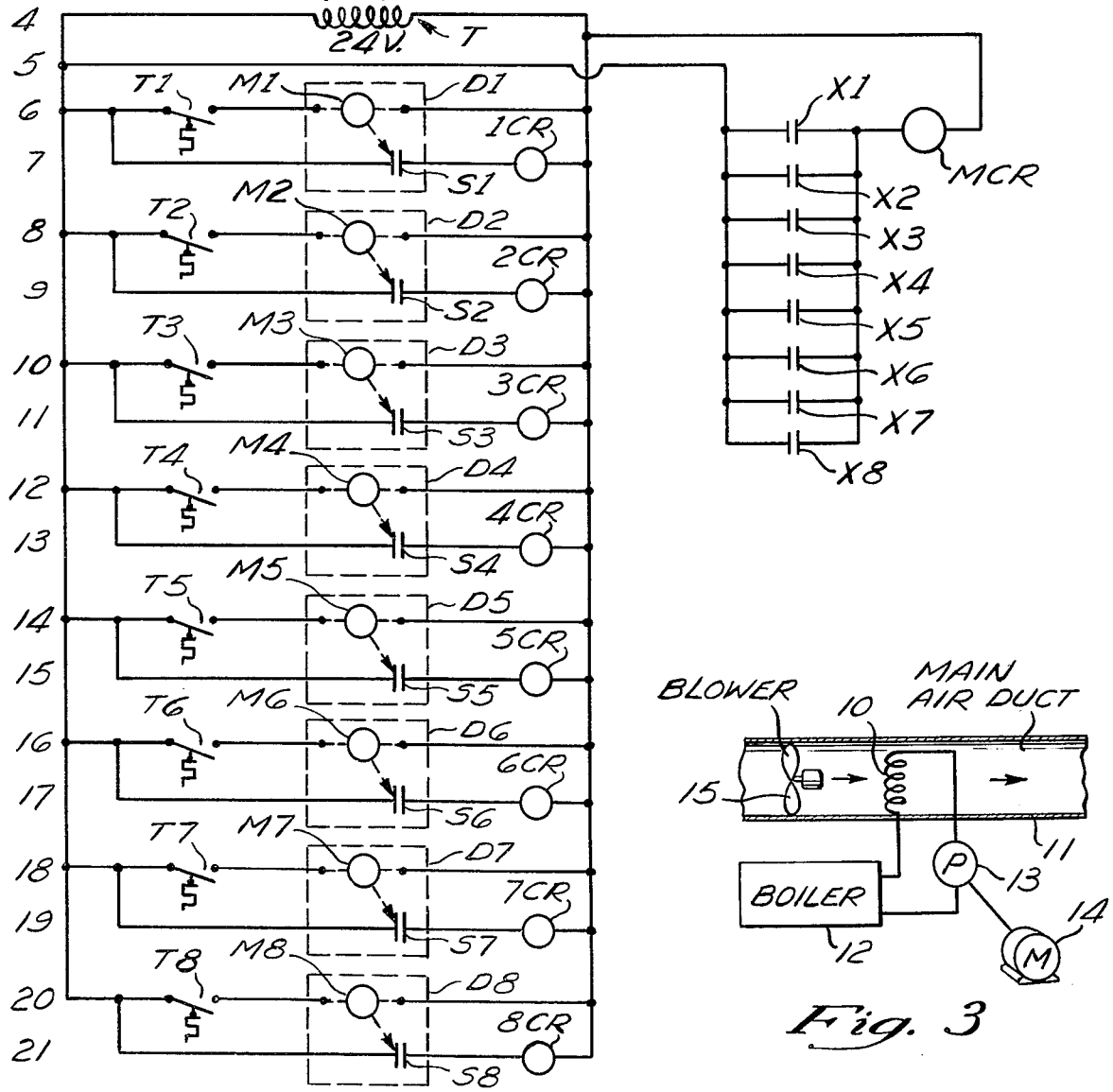
*Fig. 2*
*Fig. 3*

CONTROL FOR FORCED AIR HEATING OR COOLING SYSTEM

BACKGROUND OF THE INVENTION

In my U.S. Pat. No. 3,814,173 there is disclosed and claimed a novel control arrangement in a forced air heating and/or cooling system which operates on the advantageous principle of controlling the speed of the heating and/or cooling blower in accordance with the total demand for heated or cooled air from thermostats located at different areas (usually different rooms) of the building which is being heated or cooled. The greater the demand from the thermostats, the greater the fan speed, and vice versa.

SUMMARY OF THE INVENTION

The present invention operates on the same principle as the system of U.S. Pat. No. 3,814,173 but with greatly simplified circuitry which improves the overall system reliability because of the reduced number of components whose operation is critical to the system's proper performance.

In accordance with the present invention, an individual control relay is operated in response to the operation of each thermostat, and each such relay has contacts which are connected in the speed controller for the blower motor to control the latter's speed in accordance with the total demand from the thermostats for heated or cooled air. These relay contacts are connected across different resistors which together make up the potentiometer in the speed controller, which preferably is an SCR motor controller of known design and proven reliability.

In the preferred embodiment of this invention, the potentiometer in the motor controller has a fixed voltage applied across its opposite ends and has an intermediate tap whose potential determines the blower motor speed. On one side of this tap, the relays have normally-open contacts, each of which is connected across a corresponding resistor in the potentiometer. On the opposite side of this tap, the relays have normally-closed contacts, each of which is connected across a corresponding resistor in the potentiometer. When a thermostat demands heated or cooled air it opens a damper in the branch air duct for that area, and the damper operates a switch for energizing the corresponding control relay which then closes its normally-open set of contacts and opens its normally-closed set of contacts, thereby changing the voltage at the intermediate tap in the potentiometer to increase the blower motor speed by a corresponding increment.

A principal object of this invention is to provide a novel and simplified control arrangement for a forced air heating and/or cooling system to control the blower speed in accordance with the total demand from individual thermostats at different zones, such as rooms, of the premises to be heated or cooled.

Another object of this invention is to provide such a control arrangement which is made up of a minimum number of components, all of proven reliability, which are interconnected in a novel and relatively simple circuit to control the blower speed in essentially the same way as the more complicated arrangement disclosed in my U.S. Pat. No. 3,814,173.

Further objects and advantages of this invention will be apparent from the following detailed description of a presently preferred embodiment thereof, which is shown in the accompanying drawing, in which:

FIG. 1 illustrates schematically the potentiometer in the SCR controller for the blower motor in the heating and/or cooling system, with individual resistors in this potentiometer bridged by relay contacts in accordance with the present invention;

FIG. 2 is a schematic electrical circuit diagram showing the present control except the relay contacts for the potentiometer shown in FIG. 1; and FIG. 3 illustrates schematically a forced air heating apparatus at the main air duct of a heating system in which the fan speed is controlled by the present control arrangement.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

Referring first to FIG. 3, which illustrates one type of system in which the present control arrangement may be used, a heat exchanger 10 located in a main air duct 11 receives hot water from a boiler 12 through a pump 13 driven by an electric motor 14. A motor-driven fan or blower 15 in the main duct 11 blows air across the heat exchanger 10, and from the main air duct 11 the heated air passes to several branch air ducts (not shown) which lead to hot air registers in different rooms or other zones of the premises to be heated by this forced air system. As in my U.S. Pat. No. 3,814,173, the fan 15 is a variable speed fan whose speed is to be controlled in accordance with the total demand for heated air from the several thermostats at the different rooms or other zones of the premises to be heated.

It is to be understood that the heat source shown schematically in FIG. 3 may be replaced by a different heat source or by an air cooling source in the case of an air conditioning system.

In this system each room or other selected zone has its own individual thermostat, which controls the opening and closing of the damper in the branch air duct leading to that room or zone. These dampers are not illustrated in the accompanying drawing since they are of known design, the details of which are not important to an understanding of the present invention. Each damper is operated by a corresponding damper actuator of known design, which may be a Honeywell model M835A, sold by Minneapolis-Honeywell Regulator Company, Minneapolis, Minnesota.

Referring to FIG. 1, the fan or blower 15 in the main air duct 11 near the heat exchanger 10 is driven by a conventional electric motor 16 whose energization is under the control of an SCR (silicon controlled rectifier) motor controller 17 of known design. In one practical embodiment this SCR controller is a "Min Pak" V-S Drive manufactured and sold by Reliance Electric Company, Cleveland, Ohio.

The controller 17 has a start circuit connected to terminals 18 and 19 and operative to start the fan motor 16 when a current path is completed between these terminals. In accordance with the present invention, a set of normally-open relay contacts $m$-1 is connected across terminals 18, 19 so that the fan motor 16 is started when these contacts close, as explained hereinafter.

The controller 17 has a pair of terminals A and C across which a 12 volt DC voltage appears. Normally, in this type of controller the terminals A and C are the opposite end terminals of a potentiometer having an intermediate tap which is manually adjustable to change the fan motor speed.

In accordance with the present invention, the manually adjustable potentiometer is replaced by an electrically adjustable potentiometer having a first set of eight resistors R1-R8 and a second set of eight resistors R1'-R8' connected in series with each other between terminals A and C through respective fixed resistors R9 and R9' and adjustable resistors 20 and 20'. This potentiometer has an intermediate tap B which is connected to the junction between the last resistor R8 in the first set and the first resistor R1' in the second set. This intermediate tap B is physically fixed but its voltage is electrically adjustable, as explained hereinafter. The voltage between B and C is the output voltage of the potentiometer which determines the speed of the fan motor 16.

The resistors R1–R8 in the first set are bridged individually by respective sets of normally-open relay contacts C1–C8. When any of the sets of relay contacts C1–C8 closes, it short-circuits the corresponding resistor and thereby reduces the voltage between A and B.

The resistors R1'–R8' in the second set are bridged individually by respective sets of normally-closed relay contacts C1'–C8'. When any of the sets of relay contacts C1'–C8' opens, it removes the previously existing short-circuit for the corresponding resistor and thereby increases the voltage between B and C.

The normally-open relay contacts C1 and the normally closed relay contacts C1' in FIG. 1 are part of the same relay, which has its operating coil 1CR shown in line 7 of FIG. 2. Similarly, the relay contacts C2 and C2' are operated by relay coil 2CR in line 9 of FIG. 2, the relay contacts C3 and C3' are operated by relay coil 3CR in line 11 of FIG. 2, the relay contacts C4 and C4' are operated by relay coil 4CR in line 13 of FIG. 2, the relay contacts C5 and C5' are operated by relay coil 5CR in line 15 of FIG. 2, the relay contacts C6 and C6' are operated by relay coil 6CR in line 17 of FIG. 2, the relay contacts C7 and C7' are operated by relay coil 7CR in line 19 of FIG. 2, and the relay contacts C8 and C8' are operated by relay coil 8CR in line 21 of FIG. 2.

The circuit shown in FIG. 2 has opposite terminals at line 1 connected across a 120 volt, 60 Hz. power source. A step-down transformer at lines 3 and 4 reduces this voltage to 24 volts and applies it across the opposite terminals of each of lines 5–21, respectively. The primary winding of this transformer (line 3) is connected across the 120 volt power source through a manual on-off switch 22 and a circuit breaker 23.

Referring to lines 6 and 7 of FIG. 2, the thermostat T1 for a first room closes its normally-open contacts in line 6 when it senses that the temperature in its room has fallen to a value such that heat should be supplied to that room. When these thermostat contacts close they complete an energization circuit for an electric motor M1 in line 6 which operates the damper (not shown) in the branch air duct leading to this room. When motor M1 is turned on, it begins moving the damper from a fully-closed position to a fully-open position. Before the damper is fully open, a normally-open switch S1 in line 7 is closed, either by the damper itself or by the motor M1 which operates the damper. Motor M1 and switch S1 are shown as parts of a known type of damper actuator D1, which is illustrated schematically in its entirety as a dashed-line block in FIG. 2.

The closing of damper switch S1 completes a 24 volt energization circuit for a first control relay coil 1CR, which now closes the normally-open set of contacts C1 in FIG. 1 and opens the normally-closed set of contacts C1'.

An identical arrangement is provided for each of the other different rooms or zones in the premises to be heated. Each room has its own thermostat, T2, T3, T4, T5, T6, T7 or T8, controlling the opening and closing of a damper in a branch air duct leading into that room. Each thermostat controls the energization of a corresponding control relay coil, 2CR, 3CR . . . 8CR, through a motor, M2 . . . M8, in the corresponding damper actuator D2 . . . D8 and a normally-open damper switch, S2 . . . S8, which closes when the corresponding damper is moved from a fully-closed position toward a fully-open position.

As already explained, each control relay coil operates two sets of relay contacts (one normally-open and the other normally closed), which are connected across corresponding resistors in potentiometer R1-R8, R1'-R8' for the SCR motor controller 17.

With this arrangement, the voltage between terminals B and C of the controller 17 increases each time an individual room thermostat demands heated air. The speed of the fan motor 16 increases with each increase in this voltage.

Each control relay coil, 1CR, 2CR . . . 8CR, also operates a corresponding normally-open set of relay contacts, X1, X2 . . . X8, each connected in series with a start relay coil MCR (in line 5 of FIG. 2) across the 24 volt secondary of transformer T. Contacts X1–X8 are in parallel with each other, and the closing of any one of them will complete the energization circuit for relay coil MCR.

When energized, the start relay coil MCR closes its normally-open set of contacts m-1 in FIG. 1. These relay contacts are connected across terminals 18–19 in the "start" circuit of the SCR controller 17, so that when they close the fan motor 16 is started.

Relay coil MCR also operates an additional set of normally-open relay contacts m-2 in line 2 of FIG. 2 for starting the motor 14 for the water pump 13 in FIG. 3.

Also, relay coil MCR may operate additional sets of relay contacts (not shown) for controlling the operation of one or more humidifiers or other accessories or auxiliary equipment in the heating/cooling system.

OPERATION

Assume that the system is a heating system and that initially none of the room thermostats is demanding heat. Under these circumstances, all of the dampers in the branch air ducts leading to the various rooms will be closed, all of the control relay coils 1CR, 2CR . . . 8CR will be de-energized, relay coil MCR will be de-energized, the fan motor 16 (FIG. 1) will be off, and the pump motor 14 (FIG. 3) will be off.

Assume that now the temperature in the room monitored by thermostat T3 drops below the value set by that thermostat. The T3 contacts in line 10 of FIG. 2 will close, completing an energization circuit for the corresponding damper actuator motor M3. As the corresponding damper moves from a fully-closed to a fully-open position, the damper switch contacts S3 in line 11 are closed, thereby completing the energization circuit for control relay coil 3CR. In response to the energization of relay coil 3CR,
1. contacts X3 close, completing the energization circuit for relay coil MCR in line 5 of FIG. 2;
2. the normally-open contacts C3 in FIG. 1 close; and
3. the normally-closed contacts C3' in FIG. 1 open.

When relay coil MCR becomes energized, it closes the "start" contacts m-1 in FIG. 1, so that the fan motor 16 is turned on. Also, the pump motor 14 is turned on because relay coil MCR closes its contacts m-2 in line 2 of FIG. 2.

The speed of the fan motor 16 is determined by the voltage between points B and C in the SCR controller 17 of FIG. 1. With only one resistor (R3) short-circuited (by the now-closed relay contacts C3) between points A and B, and with only one resistor (R3') not short-circuited between points B and C, this voltage will be at the lowest level and the fan motor 16 will run at a low speed just sufficient to provide an adequate supply of heated air to the one room whose thermostat is demanding heat.

As the temperatures in other rooms fall below the levels set by their respective thermostats, these thermostats will close their respective contacts in lines 6, 8, 12, 14, 16, 18 or 20 of FIG. 2, energizing the respective control relays in lines 7, 9, 13, 15, 17, 19 or 21. When any of these control relays is energized, it will close a corresponding set of normally-open contacts C1, C2, C4, C5, C6, C7 or C8 and it will open a corresponding set of normally-closed contacts C1', C2', C4', C5', C6', C7' or C8' in FIG. 1, thereby increasing the voltage between points B and C by a corresponding increment to increase the speed of the fan motor 16 correspondingly.

With this arrangement, the fan motor speed is proportional to the number of room thermostats which are calling for heat, so that the cubic feet per minute of heated air delivered by the fan will be proportional to the total demand for heated air.

If all of the room thermostats are calling for heat then all of the resistors R1–R8 in the first set will be shortcircuited and only the resistors R9 and 20 will be effectively connected between points A and B, while all of the resistors R1'–R8' in the second set will be connected (in series with resistors R9' and 20') between points B and C. Under these circumstances, a maximum voltage drop will be established between points B and C and the fan motor 16 will run at its highest speed in this system.

As the temperature in any room reaches the desired level set by its thermostat, the corresponding thermostat contacts in line 6, 8, 10, 12, 14, 16, 18 or 20 of FIG. 2 will open and will cause the corresponding damper to close. In doing so, the corresponding damper switch in line 7, 9, 11, 13, 15, 17, 19 or 21 of FIG. 2 will re-open, de-energizing the corresponding control relay in that same line. The de-energization of any control relay will cause its normally-open contacts between points A and B in FIG. 1 to re-open and will cause its normally-closed contacts between points B and C to re-close. Therefore, the voltage between points B and C will drop and the fan motor speed will decrease each time an individual room thermostat indicates that the desired temperature has been reached in that room.

If at any time all of the rooms temperatures reach the temperatures for which their individual thermostats are set, then relay coil MCR will be de-energized and the pump motor 14 (FIG. 3) will be turned off, as will the fan motor 16 in FIG. 1.

It will be evident that the adjustable setting of resistor 20' determines the minimum fan speed, whereas the setting of resistor 20 determines the maximum fan speed.

The ohmic values of the resistors R1-R8 and of the resistors R1'-R8' need not be equal to one another. Instead the two resistors, e.g. R3 and R3', associated with a particular room thermostat may be larger or smaller than the others, depending upon the size of the room and the difficulty of heating it because of its location in the premises to be heated or other factors. Stated another way, the resistors in the potentiometer for the SCR controller 17 may be "weighted" in accordance with different heating requirements for the individual rooms.

In the present control arrangement the order or sequence in which "demand" and "no-demand" signals from the different room thermostats are produced does not matter. The voltage between points B and C in the controller 17 will always reflect the total demand for heated air, and the flow rate of heated air delivered by the blower will always be proportioned to this total demand.

While the disclosed embodiment of this control is described with reference to a heating system having eight thermostats and dampers, it is to be understood that this control may be used in a heating system or a cooling system having a greater or lesser number of thermostats and air duct dampers.

I claim:

1. In a forced-air heating or cooling system having a plurality of thermostats for different areas, a plurality of dampers which are automatically controlled individually by said thermostats to regulate the delivery of heated or cooled air to the corresponding areas, heat exchange means for heating or cooling the air to be supplied to said dampers, a variable speed motor-driven fan for passing heated or cooled air from said heat exchange means to said dampers, an electrical controller for the fan motor having a potentiometer with a plurality of resistors therein for controlling the speed of the fan motor in accordance with the potentiometer output voltage, and a plurality of control relays each operatively associated individually with a respective thermostat for operation in response to the operation of the corresponding thermostat, the improvement wherein:

said control relays have respective sets of contacts which are connected respectively across different resistors in said potentiometer to change the potentiometer output voltage each time one of said control relays is operated, whereby to change the fan motor speed each time one of said thermostats is operated.

2. A system according to claim 1, and further comprising:

a plurality of electrically-energized actuators for the respective dampers, each operatively connected to a corresponding thermostat to move the corresponding damper in response to the operation of the corresponding thermostat;

and a plurality of switches operated respectively by the dampers individually and each connected to a corresponding control relay to operate the latter in response to a predetermined movement of the respective damper for effecting a corresponding change of the fan motor speed.

3. A system according to claim 1, wherein:
said controller for the fan motor has a start circuit for starting the fan motor;
and further comprising:
a start relay operatively connected to said control relays to be operated in response to the operation of any of said control relays, said start relay having relay contacts connected in said start circuit in the controller for energizing the latter to start the fan motor when said start relay is operated.

4. A system according to claim 1, wherein:
said resistors in the potentiometer are connected in series between two different terminals in the controller;
and each of said sets of control relay contacts is normally open and is connected individually across a respective resistor in the potentiometer to close and thereby short-circuit the respective resistor when the corresponding control relay is operated.

5. A system according to claim 1, wherein:
said resistors in the potentiometer are connected in series between two different terminals in the controller;
and each of said sets of control relay contacts is normally closed and is connected individually across a respective resistor in the potentiometer to normally short-circuit the latter, each of said sets of control relay contacts opening in response to the operation of the respective control relay.

6. A system according to claim 1, wherein:
said resistors comprise a first plurality of resistors connected in series between first and second terminals in the controller, and a second plurality of resistors connected in series between said second terminal and a third terminal in the controller;
and said controller has means for applying a fixed voltage across said first and third terminals;
and said sets of control relay contacts comprise a first plurality of normally-open sets of contacts connected individually across the respective resistors in said first plurality of resistors in the potentiometer, and a second plurality of normally-closed sets of contacts connected individually across the respective resistors in said second plurality of resistors in the potentiometer, each of said normally-open sets of contacts closing in response to the operation of the corresponding control relay, and each of said normally-closed sets of contacts opening in response to the operation of the corresponding control relay.

7. A system according to claim 6 wherein:
said controller for the fan motor has a start circuit for starting the fan motor;
and further comprising:
a start relay operatively connected to said control relays to be operated in response to the operation of any of said control relays, said start relay having relay contacts connected in said start circuit in the controller for energizing the latter to start the fan motor when said start relay is operated.

8. A system according to claim 7, and further comprising:
a plurality of electrically-energized actuators for the respective dampers, each operatively connected to a corresponding thermostat to move the corresponding damper in response to the operation of the corresponding thermostat;
and a plurality of switches operated respectively by the dampers individually and each connected to a corresponding control relay to operate the latter in response to a predetermined movement of the respective damper for effecting a corresponding change of the fan motor speed.

9. In a forced-air heating or cooling system having a plurality of thermostats for different areas, a plurality of dampers which are automatically controlled individually by said thermostats to regulate the delivery of heated or cooled air to the corresponding areas, heat exchange means for heating or cooling the air to be supplied to said dampers, a variable speed motor-driven fan for passing heated or cooled air from said heat exchange means to said dampers, and an electrical controller for the fan motor having first, second and third terminals, means for applying a fixed voltage across said first and third terminals, and a potentiometer connected to said first, second and third terminals and having a plurality of resistors therein for controlling the speed of the fan motor in accordance with the potentiometer output voltage across said second and third terminals, the improvement which comprises:
an electrically-energized actuator for each damper connected to a corresponding thermostat to open the damper in response to the operation of the corresponding thermostat;
a plurality of control relays having respective sets of contacts which are connected respectively across different resistors in said potentiometer to change the potentiometer output voltage each time one of said control relays is energized, whereby to change the fan motor speed correspondingly;
a plurality of switches operated individually by the respective dampers and connected individually to corresponding control relays to energize each control relay when the corresponding damper is opened;
and wherein:
said resistors in the potentiometer comprise a first plurality of resistors connected in series between said first and second terminals in the controller, and a second plurality of resistors connected in series between said second and third terminals in the controller;
and said sets of control relay contacts comprise a first plurality of normally-open sets of contacts connected individually across the respective resistors in said first plurality of resistors in the potentiometer, and a second plurality of normally-closed sets of contacts connected individually across the respective resistors in said second plurality of resistors in the potentiometer, each of said normally-open sets of contacts closing in response to the energization of the corresponding control relay, and each of said normally-closed sets of contacts opening in response to the energization of the corresponding control relay.

10. A system according to claim 9, wherein:
said speed controller has a start circuit for starting the fan motor;
and further comprising:
a start relay operatively connected to said control relays to be energized in response to the energization of any of said control relays, said start relay having relay contacts connected to said start circuit in the speed controller for energizing the latter to start the fan motor when said start relay is energized.

11. A system according to claim 10, and further comprising:
a first adjustable resistor connected between said first controller terminal and said first plurality of resistors for determining the maximum speed of the fan motor;
and a second adjustable resistor connected between said second plurality of resistors and said third controller terminal for determining the minimum speed of the fan motor.

12. A system according to claim 6, and further comprising:
a first adjustable resistor connected between said first controller terminal and said first plurality of resistors for determining the maximum speed of the fan motor;
and a second adjustable resistor connected between said second plurality of resistors and said third controller terminal for determining the minimum speed of the fan motor.

13. In a forced-air heating or cooling system having a plurality of thermostats for different areas, a plurality of dampers which are automatically controlled individually by said thermostats to regulate the delivery of heated or cooled air to the corresponding areas, heat exchange means for heating or cooling the air to be supplied to said dampers, a variable speed motor-driven fan for passing heated or cooled air from said heat exchange means to said dampers, and an electrical controller for the fan motor having means for controlling the speed of the fan motor, the improvement which comprises:
means for continuously interrogating all of the thermostats simultaneously and for operating the speed controller in accordance with the total demand from the thermostats to set the fan motor speed accordingly.

14. A controller according to claim 13, wherein:
said controller has a potentiometer with a variablevoltage tap whose voltage determines the fan motor speed;
and said last-mentioned means comprises a plurality of control relays operatively connected individually between the respective thermostats and said potentiometer in the controller to change the voltage on said tap in accordance with the operation of said thermostats.

* * * * *